(12) United States Patent
Tollett (10) Patent No.: US 10,799,035 B2
(45) Date of Patent: Oct. 13, 2020

(54) DEBRIS CATCHER DEVICES

(71) Applicant: Tollettries, LLC, Dallas, TX (US)

(72) Inventor: Trevor Clayton Tollett, Dallas, TX (US)

(73) Assignee: Tollettries, LLC, Dallas, TX (US)

( * ) Notice: Subject to any disclaimer, the term of this patent is extended or adjusted under 35 U.S.C. 154(b) by 155 days.

(21) Appl. No.: 16/148,828

(22) Filed: Oct. 1, 2018

(65) Prior Publication Data

US 2019/0099010 A1 Apr. 4, 2019

Related U.S. Application Data

(60) Provisional application No. 62/566,708, filed on Oct. 2, 2017.

(51) Int. Cl.
| | | |
|---|---|---|
| A47D 3/00 | (2006.01) | |
| A41B 13/10 | (2006.01) | |
| F16M 13/04 | (2006.01) | |
| A47D 15/00 | (2006.01) | |

(52) U.S. Cl.
CPC ............... *A47D 3/00* (2013.01); *A41B 13/10* (2013.01); *A41B 13/103* (2013.01); *A41B 13/106* (2013.01); *A47D 15/00* (2013.01); *F16M 13/04* (2013.01)

(58) Field of Classification Search
CPC ........ A47D 3/00; A41B 13/10; A41B 13/103; A41B 13/106
USPC ............................................ 224/270; 108/43
See application file for complete search history.

(56) References Cited

U.S. PATENT DOCUMENTS

| | | | | |
|---|---|---|---|---|
| 1,050,205 A | | 1/1913 | Conley | |
| 2,199,334 A | * | 4/1940 | Ferry ................. | A45D 44/08 2/50 |
| 2,569,915 A | * | 10/1951 | Arseneault ......... | A41B 13/103 2/49.3 |
| 2,540,685 A | | 2/1952 | Myer | |
| 2,585,434 A | | 2/1952 | Caponera | |
| 2,607,052 A | | 8/1952 | Le Roy | |
| 2,608,696 A | | 9/1952 | Le Roy | |
| 2,766,455 A | * | 10/1956 | Klaine ............... | A41B 13/106 2/49.5 |
| 2,827,953 A | | 3/1958 | Jones | |
| 2,919,748 A | | 1/1960 | Alden, Sr. | |
| 2,938,574 A | | 5/1960 | Brown | |
| 3,298,736 A | | 1/1967 | Decker | |
| 3,597,763 A | * | 8/1971 | Bienvenu ........... | A41B 13/103 2/49.3 |

(Continued)

*Primary Examiner* — Kyle R Grabowski
(74) *Attorney, Agent, or Firm* — Craige Thompson; Thompson Patent Law (57) ABSTRACT

Methods and apparatus relate to a debris catcher extending substantially in a plane from an integrated skirt toward a front lip that extends upward out of the plane less than a lateral lip extends upwards out of the plane. In an exemplary embodiment, a collar may be attachable to a debris catcher to provide a soft contact. In various embodiments, at least one perimeter rib may be embedded in the debris catcher to provide a rigid and stable flat portion. In some implementations, at least one partition rib may be arranged on the debris catcher to provide separated areas. In various embodiments, the debris catcher may not only keep debris retained on the debris catcher but also may enable the debris catcher to be pulled under a table.

14 Claims, 9 Drawing Sheets

(56) References Cited

U.S. PATENT DOCUMENTS

| | | | | |
|---|---|---|---|---|
| 3,729,037 | A | 4/1973 | Dare et al. | |
| 4,014,592 | A | 3/1977 | Gist | |
| 4,165,123 | A | 8/1979 | Huston | |
| 4,288,123 | A | 9/1981 | Cone | |
| 4,298,228 | A | 11/1981 | Zampino et al. | |
| 4,650,246 | A | 3/1987 | Henriksson | |
| 4,927,024 | A | 5/1990 | Lloyd | |
| 5,348,368 | A | 9/1994 | Garcia et al. | |
| 5,382,074 | A | 1/1995 | Pietra | |
| 5,660,432 | A | 8/1997 | Davis | |
| 6,283,042 | B1 | 9/2001 | Wargo et al. | |
| 6,532,595 | B1 | 3/2003 | Holmes | |
| 6,652,947 | B2 | 11/2003 | Sweeney et al. | |
| 6,732,375 | B2 * | 5/2004 | Nornes | A41B 13/10 2/49.1 |
| 6,817,663 | B1 | 11/2004 | Stuart | |
| 7,011,363 | B1 | 3/2006 | Connery | |
| 7,185,370 | B2 * | 3/2007 | Greear-Astaud | A41B 13/10 2/49.1 |
| D591,484 | S * | 5/2009 | Lindh | D2/864 |
| 7,891,731 | B2 | 2/2011 | O'Toole | |
| 8,091,486 | B1 * | 1/2012 | Broaddrick | A47B 23/002 108/25 |
| 9,084,495 | B2 | 7/2015 | Ing et al. | |
| 9,144,321 | B2 | 9/2015 | Melo | |
| 9,226,529 | B2 * | 1/2016 | Monahon | A41B 13/103 |
| 9,289,015 | B2 * | 3/2016 | Kassis | A41B 13/103 |
| 9,370,254 | B2 | 6/2016 | Weber | |
| 2002/0124297 | A1 | 9/2002 | Caris et al. | |
| 2007/0061962 | A1 | 3/2007 | Pascual | |
| 2007/0228228 | A1 | 10/2007 | Korbonski | |
| 2008/0185880 | A1 | 8/2008 | Romaniuk | |
| 2008/0185881 | A1 | 8/2008 | Romaniuk et al. | |
| 2008/0231093 | A1 | 9/2008 | Kolenko | |
| 2009/0127917 | A1 * | 5/2009 | Foenander | A47D 1/00 297/463.1 |
| 2012/0007390 | A1 | 1/2012 | Hart | |
| 2012/0286546 | A1 | 11/2012 | Ballard | |
| 2014/0070061 | A1 | 3/2014 | Tsai | |
| 2014/0173800 | A1 | 6/2014 | Wulf et al. | |
| 2014/0319887 | A1 | 10/2014 | Ing et al. | |
| 2015/0320234 | A1 | 11/2015 | Ing et al. | |

* cited by examiner

DEBRIS CATCHER DEVICES

CROSS-REFERENCE TO RELATED APPLICATIONS

This application claims the benefit of U.S. Provisional Application Ser. No. 62/566,708 titled "Debris Catcher Device," filed by Trevor Tollett on Oct. 2, 2017.

This application incorporates the entire contents of the foregoing application(s) herein by reference.

TECHNICAL FIELD

Various embodiments relate generally to debris catcher devices, and more particularly, to a debris catcher device configured to couple to a torso of an infant or child to catch food dropped by the infant or child.

BACKGROUND

High chairs are often used by families to support infants and children during eating times. Restaurants may supply a wooden high chair for use at its tables for the convenience of its customers.

Some high chairs may include a tray or other eating surface that may be located in front and at least partially around the sides of the young person.

Infants spill, throw and drop food and objects when in a high chair or seated at a table. Young persons also throw toys when standing. Parents and others face an ongoing task of cleaning these items, usually on the floor. A common way to protect the floor is to place or mat or sheet under the child and chair.

SUMMARY

Methods and apparatus relate to a debris catcher extending substantially in a plane from an integrated skirt toward a front lip that extends upward out of the plane less than a lateral lip extends upwards out of the plane. In an exemplary embodiment, a collar may be attachable to a debris catcher to provide a soft contact. In various embodiments, at least one perimeter rib may be embedded in the debris catcher to provide a rigid and stable flat portion. In some implementations, at least one partition rib may be arranged on the debris catcher to provide separated areas. In various embodiments, the debris catcher may not only keep debris retained on the debris catcher but also may enable the debris catcher to be pulled under a table.

Various embodiments may achieve one or more advantages. For example, some embodiments may enable the debris catcher to be used with a high chair and could be pulled up to a table at the same time. In some embodiments, a higher lateral portion may enable the debris catcher to prevent some moving items from falling from the debris catcher. In some embodiments, the debris catcher may be used without a high chair. In various implementations, perimeter ribs may provide a stable and rigid flat surface which may permit the debris catcher to support heavier items. For example, the debris catcher with perimeter ribs may be used as a food tray, a work station or an activity station with partitioned sections.

In various implementations, the debris catcher may be made from one singular, monolithic piece of co-molded silicon that could be cleaned easily. In some embodiments, the debris catcher may be foldable and/or rolled up for compact storage or transport. In various examples, the debris catcher may be adjustable to adapt to conform to different ages and sizes of babies and children. The debris catcher may include an adjustment strap which may have a multitude of positions and adjustability with a back opening to make putting the debris catcher on easier and also make the debris catcher a form-fitting comfortable debris catcher with no gaps.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, debris catchers are briefly introduced with reference to FIGS. 1-4(C). Second, with reference to FIGS. 5-10, the discussion turns to show a new design related to a debris catcher.

Figure 1:
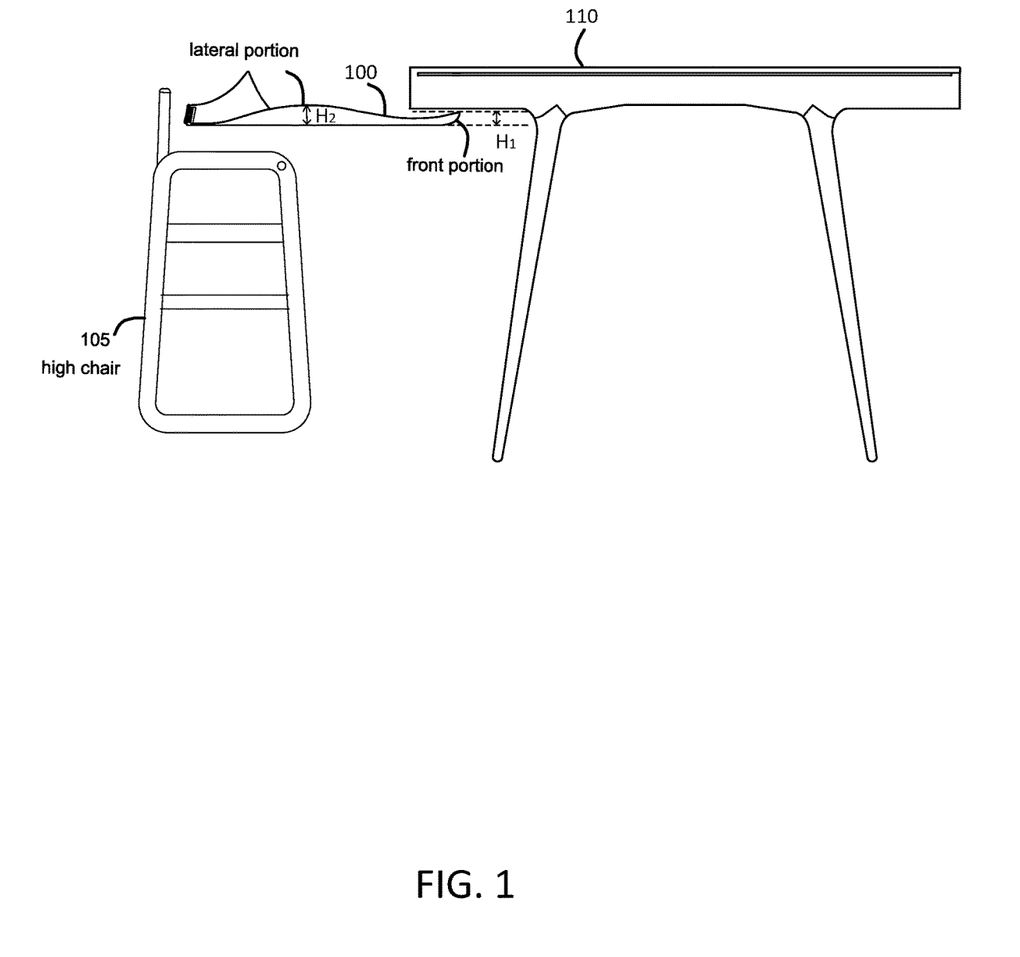
FIG. 1 depicts a side view of an exemplary debris catcher device being used in conjunction with a high chair and a table.

FIG. 1 depicts a side view of a high chair including a debris catcher device. As illustrated here, a debris catcher 100 is coupled to a high chair 105 to catch dropped items, such as food, pacifiers, toys, utensils, napkins, other items, or any combination thereof.

The debris catcher 100 includes a front portion and two lateral portions. More structural details of the debris catcher 100 are discussed with reference to FIG. 2(A)-2(B). The front portion has a first height $H_1$ and each of the two lateral portions has a second height $H_2$. $H_1$ is designed to be smaller than $H_2$, which enables the front side of the debris catcher 100 to be lower than a table 110, which simplifies advancing a chair closer to a table. Therefore, parents may push the high chair 105 towards the table 110, thereby reducing the space from the child to the table. The two lateral portions are designed with the substantially increased upward height profile $H_2$ to catch more debris and prevent debris falling out from the catcher 100, for example, preventing a meatball from falling from the debris catcher 100.

Figure 2A:
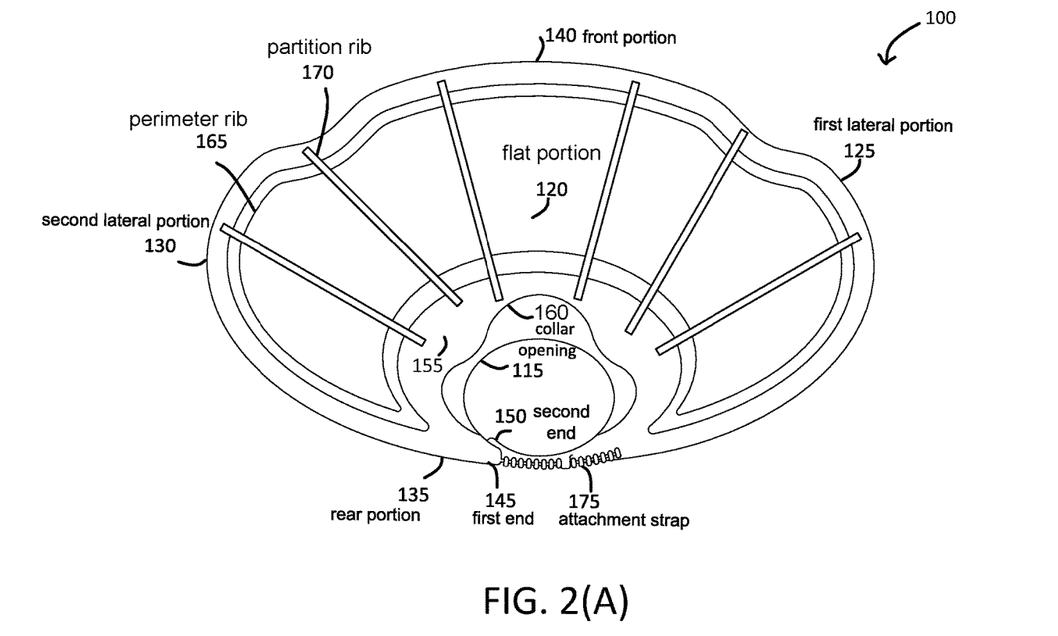
FIG. 2(A) depicts a top plan view of an exemplary debris catcher.

FIG. 2(A) depicts a top plan view of an exemplary debris catcher. In this illustrative example, the debris catcher 100 includes a flat portion 120, a first lateral portion 125 extending outward and upward from a first lateral side of the flat portion 120, and a second lateral portion 130 extending outward and upward from a second lateral side of the flat portion 120. Both the first lateral portion 125 and the second lateral portion 130 have a same height $H_2$ relative to the flat portion 120.

The debris catcher 100 also includes a front portion 140 extending outward and upward from front side of the flat portion 120. The front portion 140 has a height $H_1$ relative to the flat portion 120. $H_1$ is smaller than $H_2$. The height $H_1$ is designed to be smaller than $H_2$ to enable the debris catcher when used in conjunction a high chair, such that the high chair could be pulled up to a table.

The debris catcher 100 of the depicted example also includes a rear portion 135. The rear portion 135 includes a first end 145 extending from a left side of the flat portion 120 and a second end 150 extending from a right side of the flat portion 120. In some embodiments, the first end 145 and the second end 150 may be formed as extension members of a unitary body of the flat portion 120. In some embodiments, the first end 145 and/or the second end 150 may include a coupling system that can connect the first end 145 with the second end 150. In illustrative examples, the coupling system may be any system that can connect the first end 145 and the second end 150 together. The coupling system may be some of the attachments disclosed in the U.S. Provisional Application Ser. No. 62/566,708, titled "Debris Catcher Device" and filed by Trevor Tollett on Oct. 2, 2017. In this depicted example, the coupling system includes an attachment strap 175.

In some embodiments, the debris catcher 100 may also include a vertically-extending skirt portion to provide a larger contact area with a torso of a baby or a child to make the device more stable and comfortable to wear. In this depicted example, a vertical portion 155 extended from the flat portion 120 forms a skirt portion that may envelop the torso when worn by a child.

In some embodiments, the debris catcher 100 may include at least one perimeter rib which can provide rigidity and stability of the flat portion 120, which may enable the debris catcher to be used separately from a high chair and a tray. In this depicted example, the debris catcher 100 includes a tangential perimeter rib 165, formed with increased thickness of material or an embedded stiffener (e.g., wire, plastic).

In some embodiments, the debris catcher may include a number of extending partition ribs to help parents place items in separate compartments. In this depicted example, the debris catcher includes six partition ribs 170. By providing partition ribs, the debris catcher 100 may be also used as a stand-alone tray. Different areas may be used to contain different things, for example, a first partition may be used to contain vegetables, a second partition may be used to contain fruits. In some embodiments, the partition ribs 170 may be integrally formed and connected with the perimeter ribs 165.

Figure 2B:
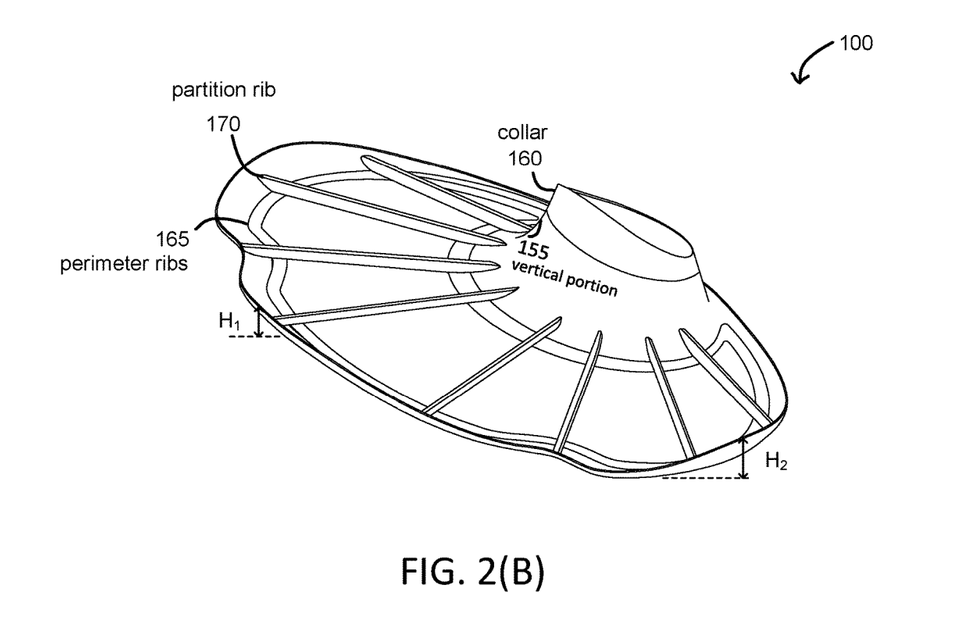
FIG. 2(B) depicts a front, top and left perspective view of an exemplary structure of the debris catcher in FIG. 2(A).

FIG. 2(B) depicts a front, top and left perspective view of an exemplary structure of the debris catcher in FIG. 2(A). In this depicted example, the debris catcher 100 includes a collar 160. The vertical portion 155 may make direct contact with skin or clothing of a child. By providing the collar 160, the contacted area may be much more comfortable.

In some embodiments, the collar 160 may be integrally formed as a part of the vertical portion 155. In some embodiments, the collar 160 may be made by softer silicone relative to the durometer of the flat portion 120, for example. In some embodiments, the collar 160 may further comprise a detachable bib, the bib may be formed from a flexible material, such as polyethylene vinyl acetate. By way of example, an embodiment of a bib is described, with reference to FIG. 2 of U.S. Provisional Application Ser. No. 62/566,708, titled "Debris Catcher Device" and filed by Trevor Tollett on Oct. 2, 2017. In some embodiments, the debris catcher may be made by a singular, monolithic piece of co-molded silicone. In some embodiments, the flexible debris catcher may be rolled up for easy compact storage and transport.

Figure 3:
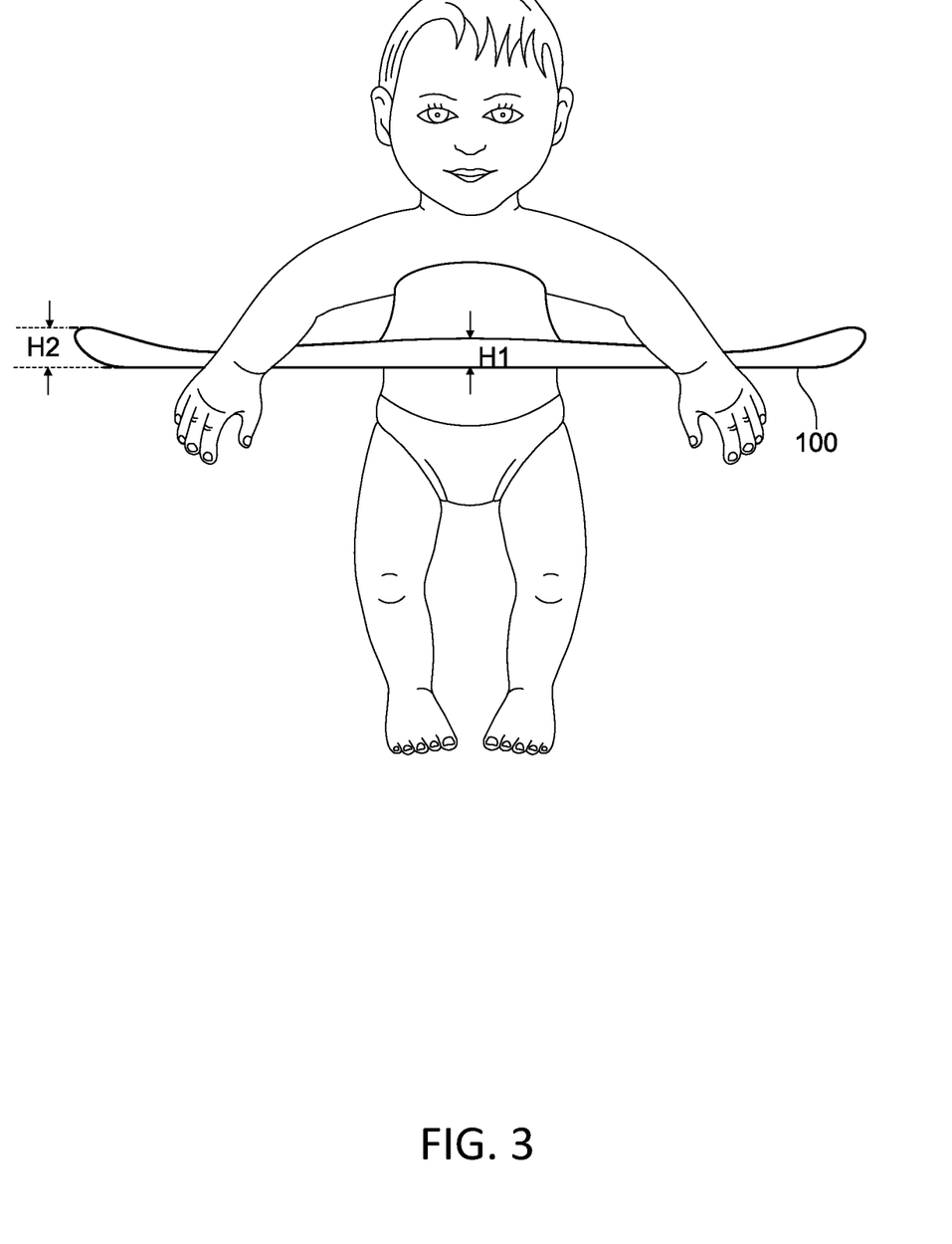
FIG. 3 depicts a front view of a baby or a child wearing the exemplary debris catcher in FIG. 2(A).

FIG. 3 depicts a front view of a baby or a child wearing an exemplary debris catcher. In this illustrated example, a debris catcher with perimeter ribs, for example, the debris catcher 100 in FIG. 2(A), is used without a high chair. In the depicted example, the debris catcher 100 is supported by the collar 160 around a torso of the child, allowing the child to have the debris catcher 100 registered to the child's front, as the child sits or walks.

Figure 4A:
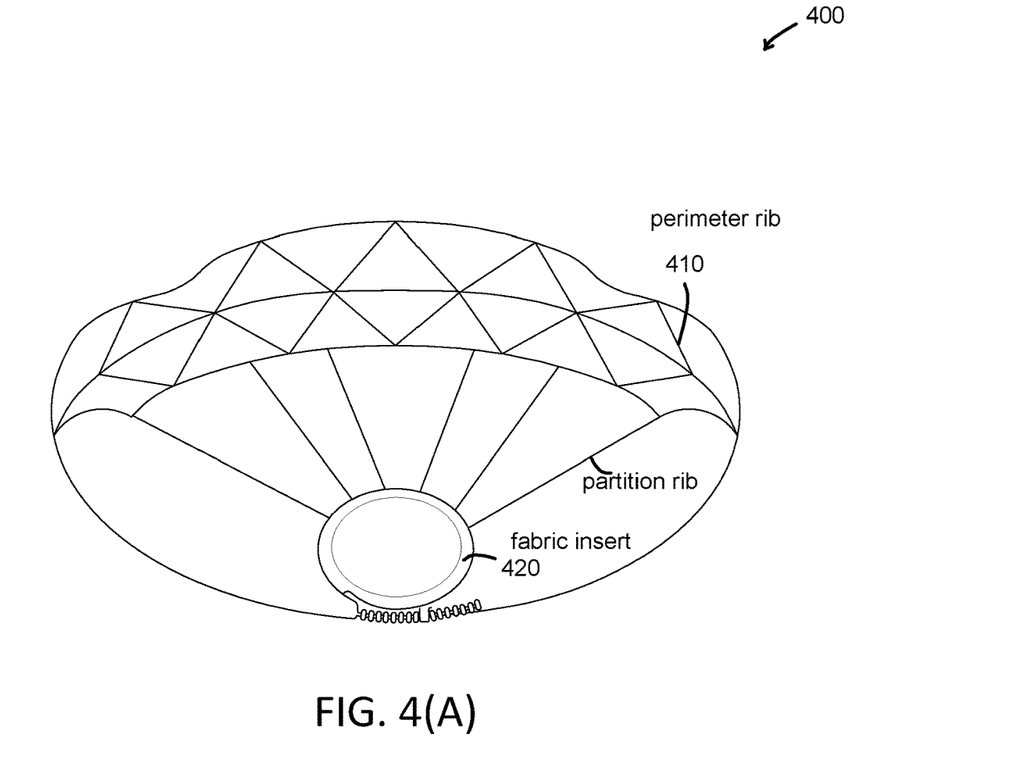
FIG. 4(A) depicts a top view of another exemplary debris catcher.

FIG. 4(A) depicts a top view of another exemplary debris catcher. In this depicted example, the debris catcher 400 includes a number of perimeter ribs 410. Those perimeter ribs 410 are configured to form triangular shapes to provide a stable and rigid debris catcher structure. In this depicted example, a removable (e.g., cushion) fabric insert 420 interposes between the torso of an infant and an inner wall of the skirt to accommodate a small sized child. As the child grows, the fabric insert 420 may be removed.

Figure 4B:
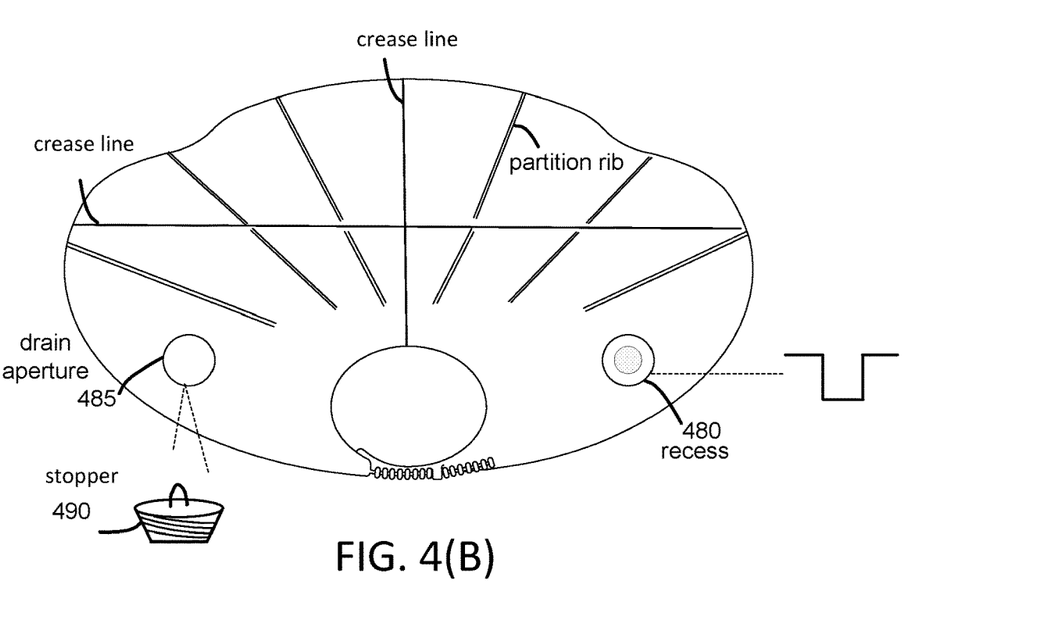
FIG. 4(B) depicts a top view of another exemplary debris catcher with a removable stopper, a drain aperture and a recess.

FIG. 4(B) depicts a top view of another exemplary debris catcher. In this illustrative example, a debris catcher also includes at least one recess on the flat portion. The recess 480 having a bottom may be used to contain liquids, for example, milk. The recess 480 may also be used to catch liquid debris, for example, water. In some embodiments, the recess 480 may be a cylindrical shape, a cuboid shape or a scalloped bowl shape, for example. In this illustrative example, a debris catcher also includes at least one crease line on the flat portion which may make the debris catcher foldable for easy storage and transport. In this depicted example, the debris catcher also includes a drain aperture 485. The drain aperture 485 is designed to discharge liquids captured by the debris catcher. The debris catcher may be tilted to allow flow toward the drain aperture, which may advantageously simplify cleanup of spills contained on the top surface of the debris catcher. In the depicted figure, a removable stopper 490 may be removed (e.g., unscrewed from mating threads on the drain aperture 485) by twisting the stopper. After draining, the stopper 490 maybe replaced to re-form a sealed plug of the drain aperture 485 that will resist leaking.

Figure 4C:
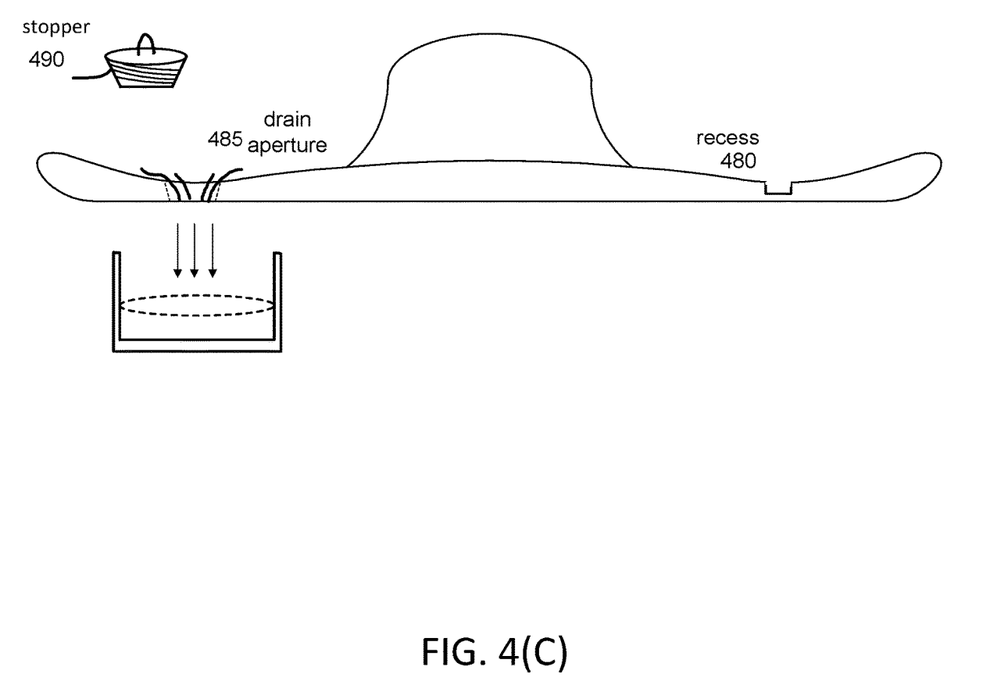
FIG. 4(C) depicts a front view of the debris catcher of FIG. 4(B).

FIG. 4(C) depicts a front view of the debris catcher of FIG. 4(B). This depicted example clearly shows how to use the drain aperture 485 and the stopper 490. The stopper 490 may be lifted out by holding its handle. Liquids or other flowable materials captured by the debris catcher flow through the drain aperture 485. In this depicted example, a glass is placed under the drain aperture 485 to contain those discharged liquids.

Figure 5:
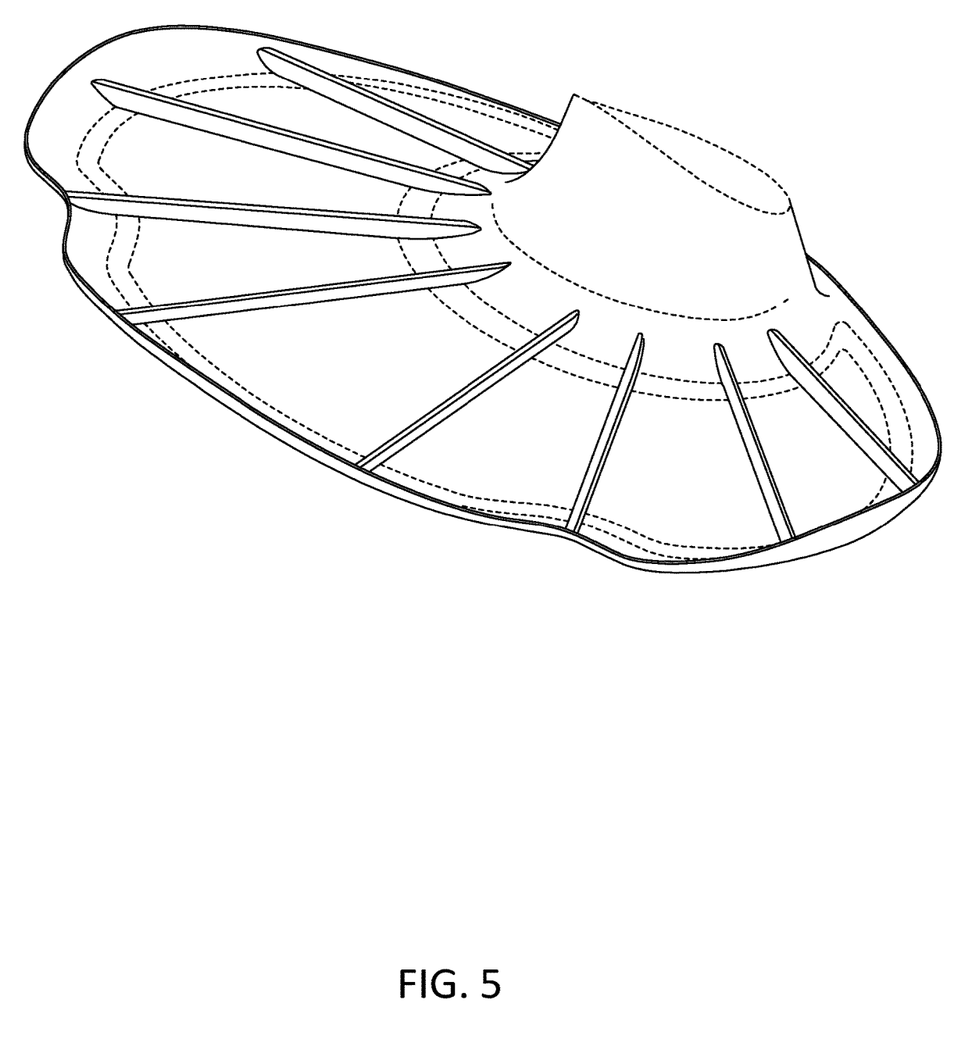
FIG. 5 is a front, top and left perspective view of a debris catcher showing the new design.
Figure 6:
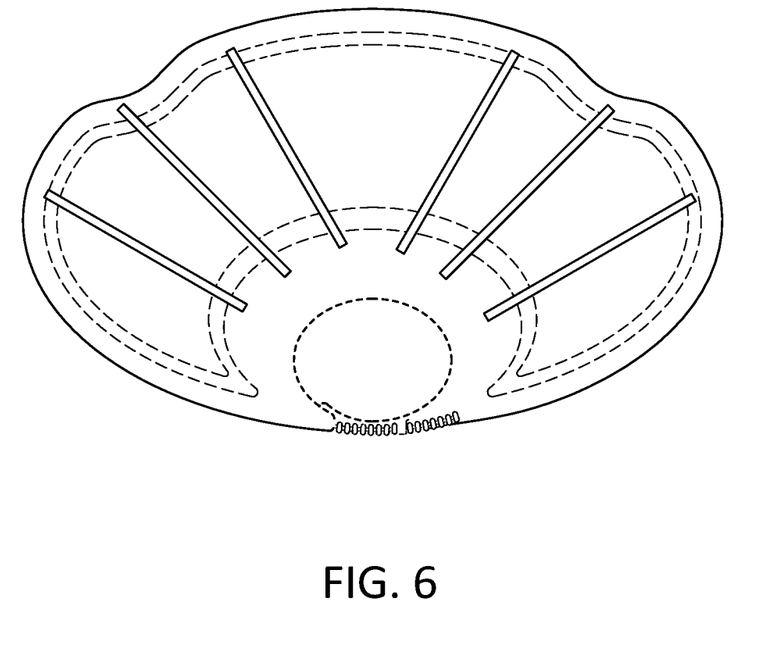
FIG. 6 is a top plan view of the debris catcher of FIG. 5.
Figure 7:
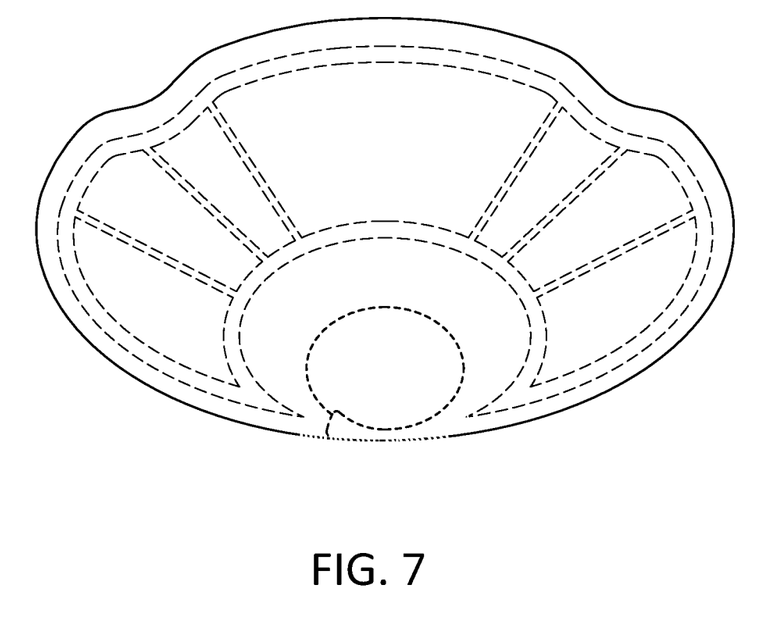
FIG. 7 is a bottom plan view of the debris catcher of FIG. 5.
Figure 8:
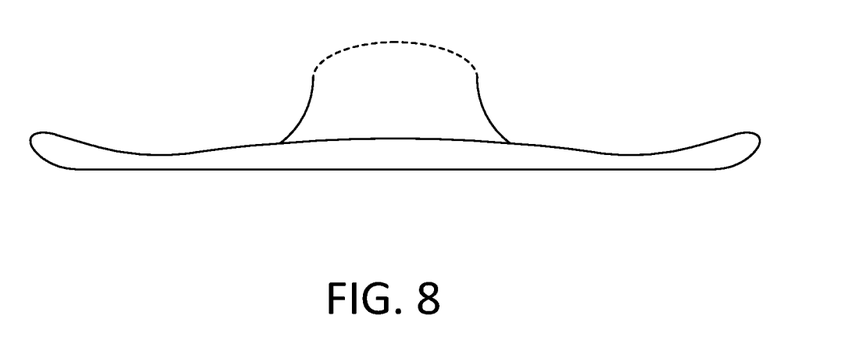
FIG. 8 is a front elevation view of the debris catcher of FIG. 5.
Figure 9:
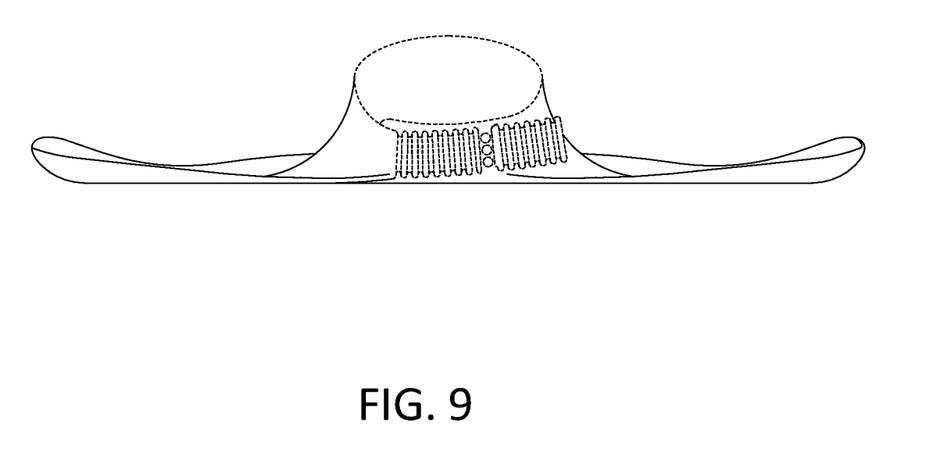
FIG. 9 is a back plan view of the debris catcher of FIG. 5.
Figure 10:
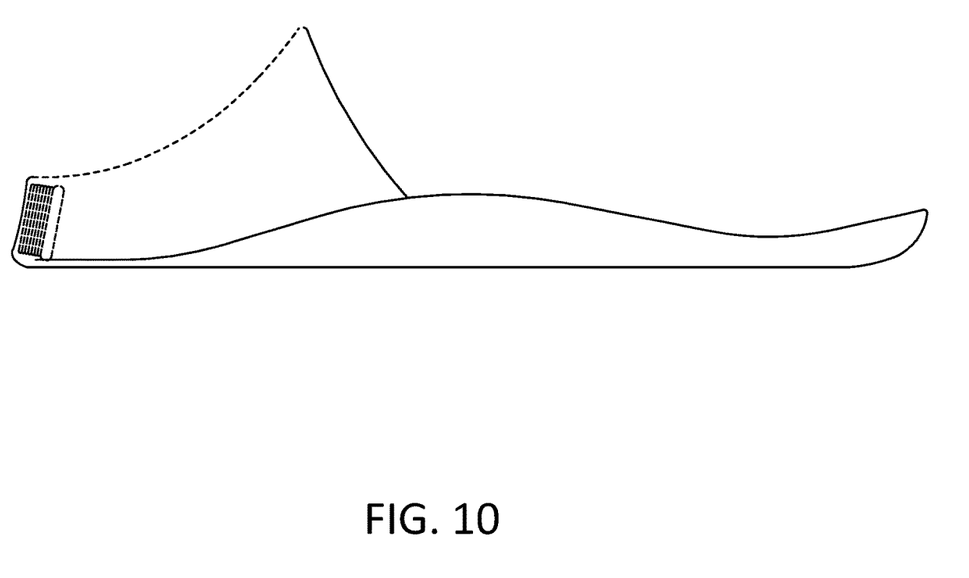
FIG. 10 is a left side elevation view of the debris catcher of FIG. 5, the opposite side being a mirror image thereof.

FIG. 5 is a front, top and left perspective view of a debris catcher showing the new design. FIG. 6 is a top plan view of the debris catcher of FIG. 5. FIG. 7 is a bottom plan view of the debris catcher of FIG. 5. FIG. 8 is a front elevation view of the debris catcher of FIG. 5. FIG. 9 is a back plan view of the debris catcher of FIG. 5. FIG. 10 is a left side elevation view of the debris catcher of FIG. 5, the opposite side being a mirror image thereof. The claimed ornamental design is shown embodied on an assembly that may be used, for example, as a debris catcher. The broken lines shown in the drawings illustrate unclaimed portions of the claimed design and form no part of the claimed design.

Although various embodiments have been described with reference to the Figures, other embodiments are possible. For example, in some embodiments, the debris catcher may be formed by a one-piece molding technology. In some embodiments, the debris catcher may be folded first and then rolled up for a compact storage or transport. By way of example, an embodiment of folded and rolled debris catcher is described, with reference to FIG. 9A-9C of the U.S. Provisional Application Ser. No. 62/566,708, titled "Debris Catcher Device" and filed by Trevor Tollett on Oct. 2, 2017, the entire content of which is incorporated here.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A debris catcher comprising:
    a flat portion (120) comprising a front side, a first lateral side and a second lateral side;
    a front portion (140) extending outward and upward from the front side of the flat portion (120), having a first height H1 relative to the flat portion (120);
    two lateral portions (125,130) extending outward and upward from the first lateral side and the second lateral side of the flat portion (120), having a second height H2 relative to the flat portion (120); and,
    at least one perimeter rib (165) embedded in the flat portion and at least one partition rib arranged on the flat portion (120);
    wherein, H2 is larger than H1.

2. The debris catcher of claim 1, further comprising a first end extending from back left side of the flat portion and a second end extending from back right side of the flat portion, the first end and the second end are coupled together by an attachment unit to form an adjustable opening.

3. The debris catcher of claim 2, wherein the attachment unit comprises an adjustment strap.

4. The debris catcher of claim 1, further comprising a vertical portion extending upward and inward from the flat portion to provide a larger contact area.

5. The debris catcher of claim 4, further comprising a collar (160) coupled to the vertical portion (155).

6. The debris catcher of claim 4, further comprising a removable fabric insert (420) interposed between a torso of a child and an inner wall of the vertical portion (155).

7. The debris catcher of claim 1, further comprising a plurality of recesses arranged on the flat portion.

8. The debris catcher of claim 1, wherein the debris catcher is foldable.

9. A debris catcher comprising:
    a flat portion (120) comprising a front side, a first lateral side and a second lateral side;
    at least one perimeter rib (165) embedded in the flat portion (120);
    a front portion (140) extending outward and upward from the front side of the flat portion (120), having a first height Hi relative to the flat portion (120);
    two lateral portions (125,130) extending outward and upward from the first lateral side and the second lateral side of the flat portion (120), having a second height $H_2$ relative to the flat portion (120);
    wherein, $H_2$ is larger than $H_1$.

10. The debris catcher of claim 9, further comprising a first end extending from back left side of the flat portion and a second end extending from back right side of the flat portion, the first end and the second end are coupled together by an attachment unit to form an adjustable opening.

11. The debris catcher of claim 10, wherein the attachment unit comprises an adjustment strap.

12. The debris catcher of claim 9, further comprising a vertical portion extending upward and inward from the flat portion to provide a larger contact area.

13. The debris catcher of claim 12, further comprising a removable fabric insert (420) interposed between a torso of a child and an inner wall of the vertical portion (155).

14. The debris catcher of claim 12, further comprising a collar coupled to the vertical portion.

* * * * *